Aug. 4, 1925.
E. ROGERS
MOTORMAN'S BACK REST AND CASH BOX
Filed May 29, 1924
1,548,285
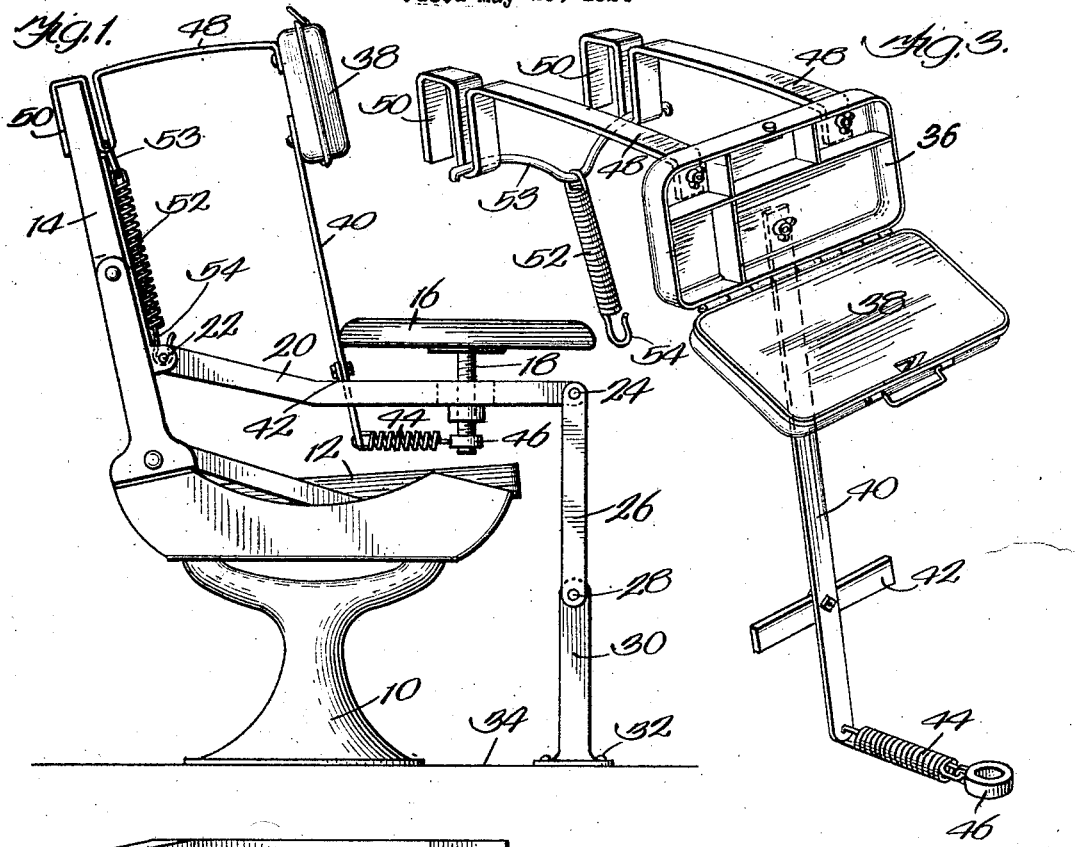
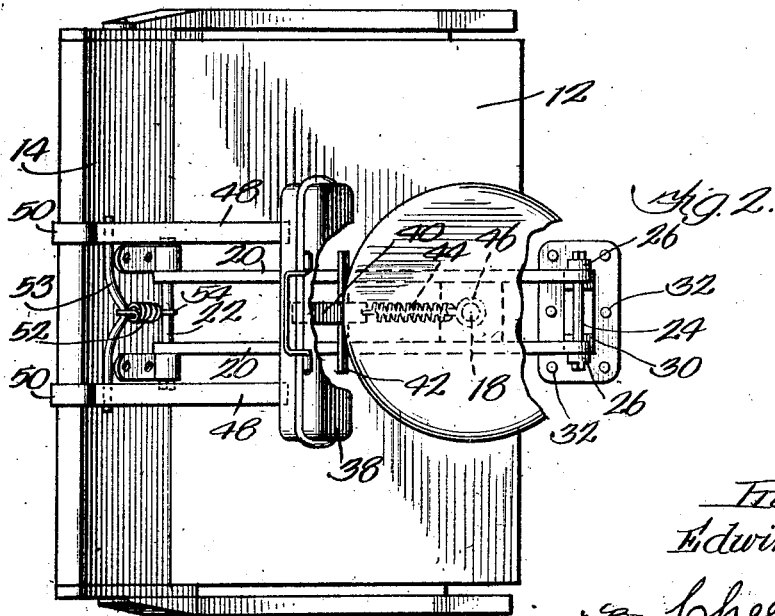
Inventor:
Edwin Rogers
by Cheever & Cox
Attys Patented Aug. 4, 1925.

1,548,285

UNITED STATES PATENT OFFICE.

EDWIN ROGERS, OF AURORA, ILLINOIS.

MOTORMAN'S BACK REST AND CASH BOX.

Application filed May 29, 1924. Serial No. 716,631.

*To all whom it may concern:*

Be it known that I, EDWIN ROGERS, a citizen of the United States, residing at Aurora, in the county of Kane and State of Illinois, have invented a certain new and useful Improvement in Motormen's Back Rests and Cash Boxes, of which the following is a specification.

Many modern street cars, particularly those of the one man operator type, used in small places and on extension routes into thinly populated districts of large cities, are provided at each end of the car with a partially removable, rotatable operator's seat, normally without back support, located when in use at some little distance from but in proximity to the upright, reversibly inclined back of the end passenger's seat of the car, and movable when the operator moves to the opposite end of the car, to run the car in that direction, to a position out of the way of said last passenger's seat, thereby permitting said passenger's seats reversal in conventional manner to permit a passenger occupying that seat to face forward in the car.

The object of this invention is to provide a back support for the rotatable operator's seat which is readily transferrable between operator's seats at opposite ends of the car, which acts as a brake to prevent too ready rotation of the operator's seat, and in which the back support is a cash box or other general utility case for the effects of the operator, usually the motor man, operating the car.

The invention consists in means capable of attaining the foregoing and other objects, which can be easily and cheaply made, which is satisfactory in use, and is not readily liable to get out of order. The invention further consists in numerous features and details of construction hereafter more fully set forth in the specification and claims.

Referring to the drawing in which like numerals represent the same parts throughout the several views:

Figure 1 is a side and Figure 2 a plan view of mechanism illustrating this invention in its preferred form applied to the two seats above referred to of a car.

Figure 3 is a perspective view, the mechanism disassociated from the car seats.

The conventional car equipment to which this invention is applied includes a passenger's seat base 10 carrying the seat cushion 12 and back 14 positioned for occupancy by a passenger facing to the right in Figure 1, the back 14 being swingable from the position shown to one the same distance to the right of the upright center of base 10 in which latter position the user of seat 12 faces in the opposite direction, i. e. to the left in Figure 1. The conventional car construction also includes operator's seat 16, rotatably mounted by screw 18 turning in a horizontal link 20, pivotally connected to seat back 14 by bolt 22, and pivotally connected at its opposite end by bolt 24 to vertical link pivoted at 28 to vertical standard 30, secured by bolts 32 or the like to the floor 34 or other support on which base 10 rests. The parts are conventionally so constituted that seat back 14 can move to the right as described from the position of Figure 1, seat 16 being during said movement carried to the right on links 20 and 26 out of the way of back 14.

In solving the problem of this invention of providing a back rest for an operator occupying rotatable seat 16, a cash or other box 36, having a hinged cover 38, is provided, the same being of the shape shown or other suitable shape for acting as a support to the back of the occupant of seat 16. This back rest box 36 is supported upon the upper end of a vertical post 40 of proper size to extend between the separated parallel members making up link 20, cross member 42 on the upright resting on the links 20. On the lower end of upright 40 is retractible spring 44 extending horizontally toward seat post 18 and having a loop or ring 46 loosely fitable over the post whereby the spring draws upright 40 into frictional contact with the periphery of seat 16, thus preventing its too ready rotation. Seat back 36 is horizontally positioned by one or more brace bars 48 rigidly attached at one end to the box and provided at their other ends with means detachably engaging passenger seat back 14. In the particular case here illustrated this securing device includes downwardly open U notches 50 engageable over the top of seat back 14 and a retractible spring 52 attached at one end, for instance, by yoke 53 to the brace device and at the other end, provided with a hook 54 engaging bolt 22. The result of the construction described is that when assembled as shown the box 36 acts as a back support for the occupant of seat 16 and that by simply detaching hook 54 from rod 22 the entire device is obviously removable for transportation to the other end of the car in which it is used or otherwise.

Having thus described my invention what I claim and desire to secure by Letters Patent is:

1. In mechanism of the class described, in combination with an upright car seat back, a rotatable operator's seat adjacent thereto but separated therefrom, a back support block of the operator's seat, horizontally disposed means bracing it from the upright seat back, upwardly extending means supporting it adjacent to the operator's seat, a spring connection detachably attaching the horizontally disposed means to the back of the car seat and a spring connection detachably attaching the lower part of the upwardly extending support to the pivot of the operator's seat.

2. In mechanism of the class described, in combination with an upright car seat back, a rotatable operator's seat adjacent thereto but separated therefrom, a back support block for the operator's seat, horizontally disposed means bracing it from the upright seat back, upwardly extending means bearing on the side of the operator's seat to check its rotation, supporting it from a point adjacent to the operator's seat, a spring connection detachably attaching the horizontally disposed means to the back of the car seat and a spring connection detachably attaching the lower part of the upwardly extending support to the pivot of the operator's seat.

3. In mechanism of the class described, in combination with an upright car seat back, a rotatable operator's seat adjacent thereto but separated therefrom, a separable unit including a back support cash box for the operator's seat, horizontally disposed means bracing it from the upright seat back, upwardly extending means bearing on the side of the operator's seat to check its rotation, supporting it from a point adjacent to the operator's seat, a spring connection detachably attaching the horizontally disposed means to the back of the car seat, and a spring connection detachably attaching the lower part of the upwardly extending support to the pivot of the operator's seat.

In witness whereof, I have hereunto subscribed my name.

EDWIN ROGERS.